United States Patent Office 3,341,080
Patented Sept. 12, 1967

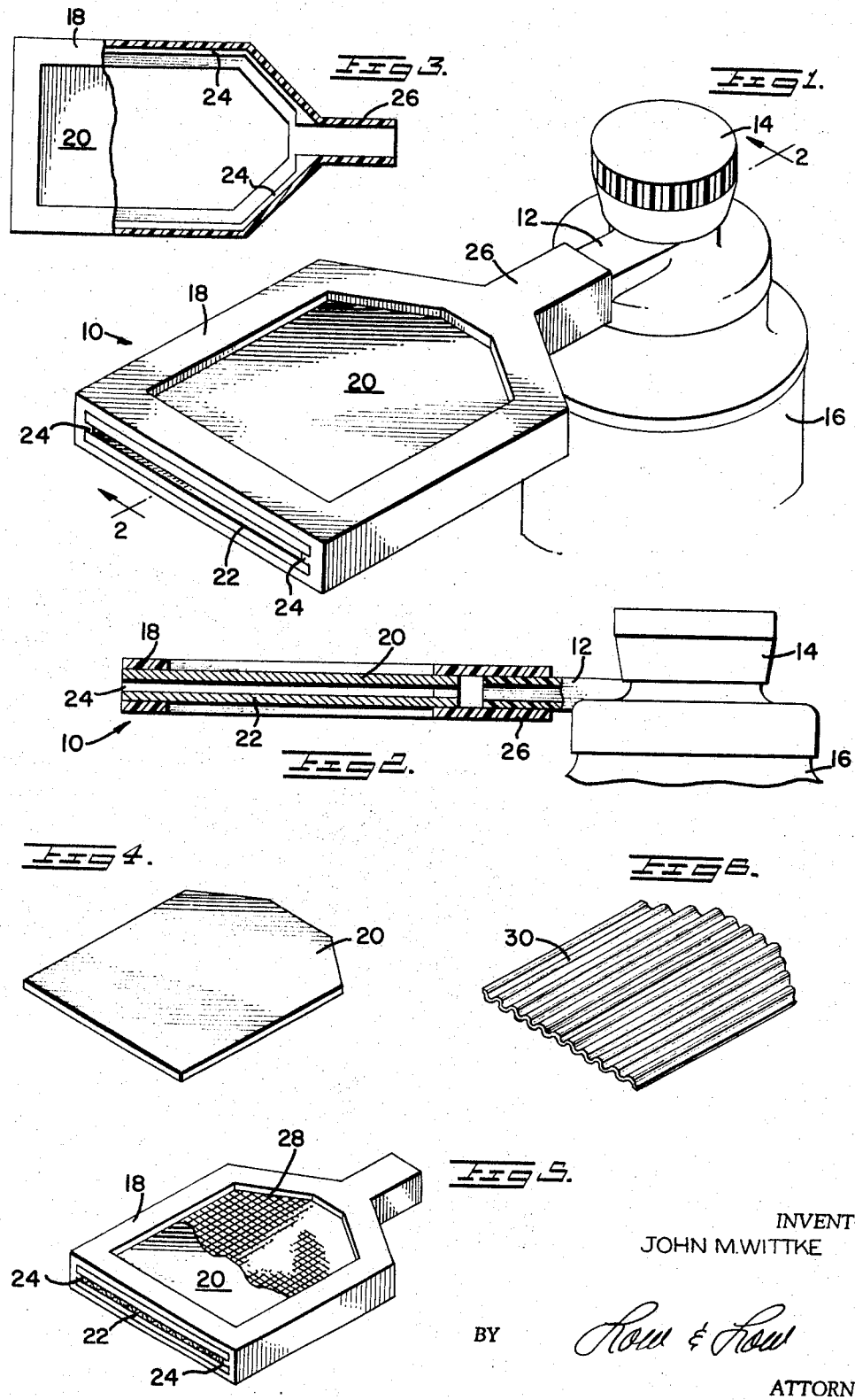

3,341,080
HEATING DEVICE FOR DISPENSERS
John M. Wittke, 10 Breezeknoll Drive,
Westfield, N.J. 07090
Filed May 14, 1965, Ser. No. 455,767
5 Claims. (Cl. 222—146)

This invention relates to a heating device, and more particularly to an inexpensive and easily fabricated film-spreading nozzle attachment for dispensing containers of shaving lather, ointments, cosmetics or the like plastic products which permits heating of the dispensed product prior to application thereof as a wide heated film onto the skin.

In recent years the widening consumer acceptance of aerosol-type or similar pressurized shaving creams in particular, has resulted in efforts to develop means for heating the dispensed product so as the same will be warm when applied to the face or skin, to more nearly approximate conventional hot water and brush lathers. Further, a heated lather is particularly desirable with pressure-dispensed products of the aerosol type inasmuch as the lather is often quite cool due to evaporation of the volatile propellant therefrom.

Further, in applying other creamy medicaments or cosmetics, such as salves, medicines, ointments and the like, it is often desirable or advisable to have the same warmed or heated upon application to enhance the beneficial effect thereof.

Examples of rather complex devices improvised in recent years to accomplish these ends are illustrated by the U.S. patents to Lannert 2,873,351, Reich et al. 3,171,-572 and Fouts et al. 3,098,925. These devices, however, suffer from the general disadvantage of complexity of manufacture, and high cost of fabrication and mass production assembly, as well as in some instances being impractical, awkward or inconvenient for the used to employ.

It is therefore a principal object of my invention to provide a heating attachment for a pressurized dispenser of shaving lather or the like which is easily fabricated on a production line basis and which is readily attachable to the container by the user.

It is another important object of my invention to provide a product heating device comprising a minimum of components yet which are durable and virtually indestructible in actual use, while yet being capable of easy disassembly for cleaning if desired.

A further significant economic advantage of my heating device resides in that the same may be removed from the particular dispensing container when the latter is exhausted, and thence reused with succeeding containers, thereby causing the consumer to purchase only one such heating device rather than a new complete unit with each successive lather of cosmetic container.

Other objects and advantages will be apparent from the following detailed description taken in connection with the accompanying drawings, in which:

FIG. 1 is a perspective view of a preferred form of my heating device associated with a conventional pressure-dispensing container.

FIG. 2 is a side sectional elevation taken on lines 2—2 of FIG. 1 illustrating my heating device, the dispenser being shown for simplicity in full lines except for a portion of the discharge spout thereof.

FIG. 3 is a top plan view of the heating device of my invention shown partially in section.

FIG. 4 is a perspective view of one of the heating plates of my device.

FIG. 5 is a perspective view similar to FIG. 1 showing a modified form of my invention wherein the top heating plate is broken away.

FIG. 6 illustrates a modified heating plate for use with my device.

Referring to the drawings, my novel heating device is shown at 10 in FIG. 1 as fitted onto the discharge spout 12 of a conventional dispensing valve assembly housing 14 associated with a pressure dispensing can 16 of shaving lather, ointments, etc. While the invention finds particular utility with a pressurized container of the type shown at 16, will be understood that such container is for illustrative purposes only, and that the heating device 10 may be employed with any dispensing container having a discharge spout, as, for example, a resilient container of polyethylene, such as the well known "squeeze" bottle.

The heating device 10 comprises a generally polygonal open frame 18 which may be molded conveniently from plastic material such as polyethylene. In the preferred form of the invention, upper and lower similar heat transfer plates 20, 22 are slidably associated with frame 18, the plates being easily fabricated from sheet material such as thin gauge aluminum stock or other metal characterized by good heat conductivity, and which will not deleteriously interact with the material or product being dispensed.

The respective plates 20, 22 are maintained in parallel spaced relation within the frame 18 by means of a pair of similar inwardly extending ribs 24 disposed within the frame and medially along each longitudinal side wall thereof as clearly seen in FIG. 3. The spacing between the upper and lower flanges of frame 18 and the intermediate ribs 24 respectively is preferably slightly less than the thickness of the heat transfer plates 20, 22, whereby the same may be readily slid into position within the frame yet frictionally retained therein by virtue of the resilient character of the plastic material, while yet permitting reverse sliding movement thereof if desired to remove the plates for cleaning of the device.

The frame 18 further includes a rearwardly extending inlet port 26 which is configured to telescopically interfit with and slide over the discharge spout 12 of the pressurized dispenser, whereby the heating device 10 may be readily associated with the container for use when desired, yet with equal facility may be removed for storage and/or cleaning, as well as reuse with a different container.

Plates 20, 22 and the frame 18 cooperate to provide a product chamber therebetween of generally wide and flattened configuration fully open at its forward end whereby the product is discharged therefrom in a wide film or sheet. The other end of the chamber along with inlet port 26 partakes of a generally Y-shaped plan configuration facilitating the spreading of the product stream into a flattened sheet as it enters the chamber. In this connection, the spacing between upper and lower plates 20, 22 is preferably slightly less than the height or diameter of discharge spout 12, thereby to form a flow-retarding restriction to enhance lateral spreading of the product as it enters the heating chamber.

Further, the upper and lower peripheral plate-retaining flanges of frame 18 are preferably of a minimum size necessary to provide structural rigidity thereby to maximize the areas of exposed upper and lower surfaces of the respective heat transfer plates 20, 22.

In use, the assembled heating device 10 will be telescoped onto the discharge spout of a pressurized dispenser of shaving lather, medicament, ointment or the like, and thereafter the container held by the user adjacent a hot water faucet stream to dispose the plates 20, 22 in the path of the stream, whereby the plates 20, 22 will become appreciably heated by the hot water flow thereover. Alternatively, the user may immerse the device 10 in a cup of hot water or other reservoir-like supply thereof to heat the plates 20, 22.

Thereafter, the user positions the container with the attached heating device at the locale of application and actuates the valve assembly 14, or otherwise effects dispensing of the product into the device 10 in accordance with the particular character of the associated container, causing a flow of the product to be discharged through spout 12 into inlet port 26 of the heating device 10 and thence passing in a widening flat stream through the heating chamber between spaced upper and lower plates 20, 22, with the product emerging therefrom in a flat sheet or film for application over the face as in the instance of shaving lather, or other portions of the body as may be desired. In this manner, then, the product is not only efficiently heated to a desired temperature, but is likewise dispensed in the form of a wide flat stream for rapid covering of an area without excess product wastage.

It will be seen from the foregoing that the construction of the heating devices is quite simple in structural character and is capable of mass production on an assembly line basis, inasmuch as the same comprises only the resilient plastic open frame 18 and the similar upper and lower heating plates 20, 22. Further, the heating device 10 may be readily removed from the container for storage when desired, and retained for use with other and succeeding containers of the same or differing products without requiring the purchase of a new heating device for each successive container of pressurized product. In this connection it will be noted that the plastic frame 18 which peripherally surrounds the heating plates prevents possible discomfort to the user should the device 10 be removed from the dispenser while the plates are still relatively hot, which may be on the order of 140° F. following hot water flow thereover.

Further the heating device 10 lends itself well for marketing and promotion purposes inasmuch as the exposed upper and lower surfaces of the heating plates 20, 22 may be suitably embossed or lithographed with readily visible instructional, advertising, or trademark indicia, thereby enhancing the utility of the device without detracting from its efficiency in use.

In FIG. 5 I have shown a slightly modified form of my invention wherein a piece of open wire mesh 28 is disposed within the chamber between the upper and lower heating plates 20, 22. In this form of the invention, the wire mesh 28 serves the dual functions of further retarding the flow of product so that the same spreads promptly into a flat sheet before emerging from the discharge end of the chamber, and enhancing the transfer of heat imparted thereto from the plates 20, 22 throughout the product being dispensed by virtue of the sharply increased heating surface area.

FIG. 6 illustrates a modified heating plate 30 and further shows the versatility which the instant heating device provides. In this form of the invention, the modified plate 30 is of gently corrugated cross sectional configuration, a pair of such plates being provided in lieu of the plates 20, 22 of FIG. 1. This construction also provides greater surface area for imparting heat to the dispensed product, while still providing the advantages of low cost and ready assembly of the heating device as above discussed. The same is also illustrative of how the heating plates may be varied in their configuration or embossed in any desired manner as may be required or desirable with particular products or in connection with ornamentation, marketing or advertising in connection therewith.

It will be seen then from the foregoing that the heating device of my invention is novel in its unique simplicity and low cost of manufacture and assembly, yet providing material advantages in the easy and ready dispensing of heated products such as shaving lather, medicinal cosmetics, etc., while also providing for ready interchangeability between various dispensers 16, as well as providing means for enhancing the saleability thereof by trademark indicia or other means as may be desired.

Further, in certain instances when the pressurized product may be of such nature that further use of the heating device 10 would not be advisable, it will be seen that the device 10, and more particularly the frame 18 thereof, could be molded integrally with the discharge spout 12 and associated valve housing structure of the dispensing container, rather than being a separate detachable item with respect thereto. In such instance, although reuse of the device would be prevented, it will be seen that all of the advantages otherwise present in the invention would otherwise be retained as to simplicity, ease of heating, etc.

Similarly, while the heating plates are preferably metallic, it is apparent that the same may comprise plastic sheets of sufficient thinness to provide an adequate measure of heat transfer to the chamber therebetween. This arrangement is suitable when a maximized heating effect is not necessary, as for example in the application of face lotions, baby lotions, various medicinal ointments, etc. In such case the use of an inserted wire screen or mesh as at 28 in the product chamber is desirable to enhance the heating capability of the device. While the heat from a usual hot water source will be sufficient to warm the mesh, there may be provided an exposed portion thereof adjacent the discharge end, or an exposed metallic member connected to the mesh to aid in heat transfer thereto.

What is claimed is:
1. A heating device for a plastic product dispenser having a discharge spout comprising:
   a pair of metallic plates,
   an annular frame of plastic material having means thereon for slidably receiving said metallic plates in spaced superposed relation with a major external surface portion of at least one said plate exposed, said plates and said frame defining over a substantial portion thereof a wide, thin product-heating chamber terminating at one end in a wide, thin dispensing outlet and at the other end in a narrower inlet port, said outlet being at least as wide as the wide portion of said chamber,
   and means for detachably securing said inlet port to the discharge spout of the dispenser.
2. A heating device as defined in claim 1 wherein said metallic plates are aluminum.
3. A heating device as defined in claim 1 wherein said metallic plates are corrugated.
4. A heating device as defined in claim 1 wherein an additional heat transfer means consisting of wire mesh is disposed between said metallic plates.
5. A heating device as defined in claim 1 wherein said means on said annular frame for slidably receiving said metallic plates in spaced superposed relation includes a pair of ribs, each projecting inwardly toward the other from opposite walls of said frame.

References Cited
UNITED STATES PATENTS

| | | | |
|---|---|---|---|
| 331,532 | 12/1885 | Nichols | 165—170 |
| 902,812 | 11/1908 | Goetz et al. | 165—170 X |
| 2,573,538 | 10/1951 | Brown | 165—170 |
| 2,587,116 | 2/1952 | Clay | 165—170 |
| 2,873,351 | 2/1959 | Lannert. | |
| 3,171,572 | 3/1965 | Reich et al. | 222—146 |

RAPHAEL M. LUPO, *Primary Examiner.*